United States Patent [19]

Land

[11] 3,772,025
[45] Nov. 13, 1973

[54] DIFFUSION TRANSFER RECEIVING SHEETS

[75] Inventor: Edwin H. Land, Cambridge, Mass.
[73] Assignee: Polaroid Corporation, Cambridge, Mass.
[22] Filed: June 19, 1972
[21] Appl. No.: 264,256

Related U.S. Application Data

[60] Division of Ser. No. 675,472, Oct. 16, 1967, Pat. No. 3,671,241, which is a continuation-in-part of Ser. No. 437,799, March 8, 1965, abandoned.

[52] U.S. Cl. ................................ 96/76 R, 96/29
[51] Int. Cl. ........................................... G03c 1/48
[58] Field of Search ................................ 96/29, 76

[56] References Cited
UNITED STATES PATENTS
3,345,165  10/1967  Land .................................... 96/29
3,369,901  2/1968  Fogg et al. ............................ 96/29

Primary Examiner—Norman G. Torchin
Assistant Examiner—John L. Goodrow
Attorney—Charles Mikulka et al.

[57] ABSTRACT

Image-receiving elements for use in forming images in silver by diffusion transfer processes are prepared by forming a dispersion of an insoluble silver precipitating agent in an alkali-impermeable polymer, e.g., cellulose acetate. At least a depthwise portion of a layer of that dispersion is hydrolyzed to an alkali-permeable polymer, e.g., cellulose. The silver precipitating agent may be present in unhydrolyzed portions as well as in hydrolyzed portions. The support may be paper or a transparent film.

19 Claims, 2 Drawing Figures

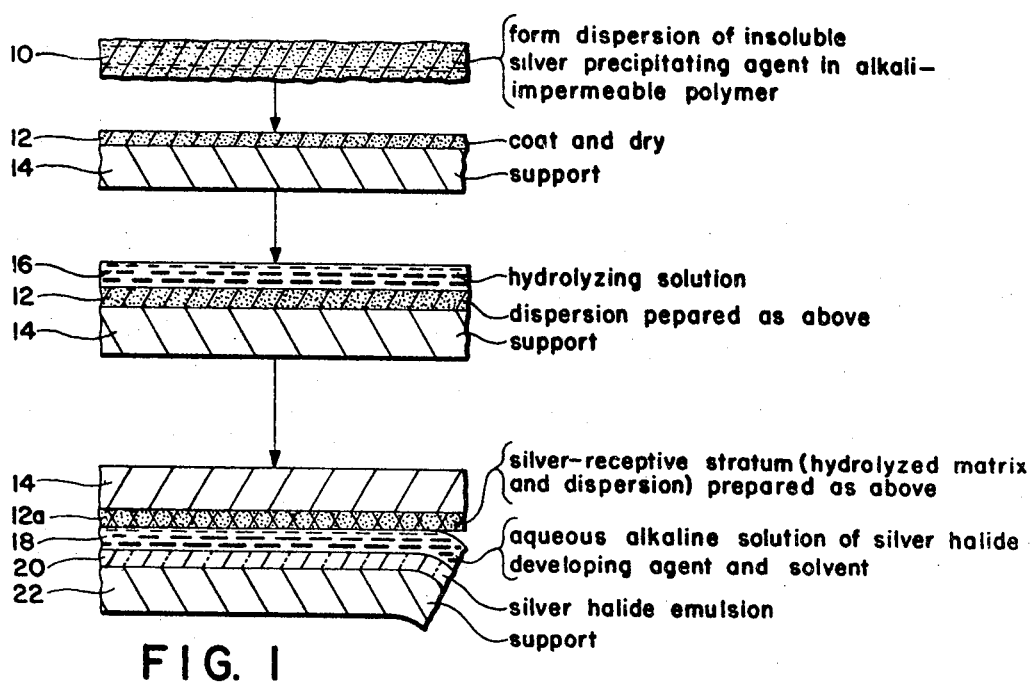

DIFFUSION TRANSFER RECEIVING SHEETS

This application is a division of my copending application, Ser. No. 675,472 filed Oct. 16, 1967 now U.S. Pat. No. 3,671,241 issued June 20, 1972, which application in turn is a continuation-in-part of Ser. No. 437,799 filed Mar. 8, 1965, now abandoned.

The present invention relates, in general, to methods for forming fine dispersions useful in photography, and, more particularly, to novel methods of forming fine dispersions of a silver precipitating agent in an alkali-permeable matrix material and to photographic products and processes employing or embodying said dispersions.

Image-receiving elements useful in forming silver transfer images in diffusion transfer processes have generally been prepared by incorporating a silver precipitating agent in an alkali-permeable matrix material, e.g., gelatin, polyvinyl alcohol, colloidal silica, etc. In such processes, the silver precipitating agent is dispersed in a coating solution comprising the alkali-permeable matrix material prior to coating thereof, or the silver precipitating agent has been formed in situ in a coated layer of the alkali-permeable matrix material by imbibing appropriate reagents into said coating.

This invention involves the formation of silver receptive layers by forming a dispersion of an insoluble silver precipitating agent in a solution of an alkali-impermeable polymer, and the subsequent conversion of at least a portion of said alkali-impermeable polymer to an alkali-permeable polymer.

A further object of this invention is to prepare silver precipitant dispersions by vacuum deposition of the silver precipitant onto a matrix material which is alkali-impermeable but which may be rendered alkali-permeable after the materials have been blended to disperse the internal phase material (silver precipitant) in the external phase material.

Accordingly, a principal object of this invention is to provide a novel process for preparing dispersions of at least one silver precipitating agent wherein said silver precipitating agent is dispersed as an internal phase in an alkali-impermeable matrix material, and said matrix material is subsequently rendered alkali-permeable by suitable treatment.

An important object of this invention is to provide novel image-receiving elements having regenerated cellulose as the matrix material.

A further object of this invention is to provide silver-receptive materials or layers by said process, and to provide diffusion transfer images employing said silver-receptive materials.

Still another object of this invention is to provide novel photographic processes employing such dispersions in the formation of photographic images in silver.

Other objects of the invention will in part be obvious and will in part appear hereinafter.

The invention accordingly comprises the process involving the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description, taken in connection with the accompanying drawing wherein:

FIG. 1 is a flow diagram showing exaggerated cross-sectional views of material undergoing steps of preparation and use in a photographic process in accordance with the present invention; and FIG. 2 is an exaggerated cross-sectional view of an image-receiving element representative of the preferred embodiment of this invention.

Generally, as indicated above, the processes of the present invention involve incorporating solid silver precipitating agent in a matrix material composed of an alkali-impermeable polymer or polymeric material to provide a dispersion wherein said silver precipitating agent constitutes the inner phase of said dispersion. The resulting dispersion usually is then coated as a layer on a support and subjected to appropriate hydrolysis treatment to convert at least a depthwise portion of said alkali-impermeable polymer to an alkali-permeable polymer. Silver-receptive elements thus may be prepared in a highly reproducible, economical and efficient manner, and the silver receptive layer may be readily and advantageously modified according to the particular processing techniques ultimately employed to form silver transfer images therein. These methods and the advantages obtained by this invention will be set forth in appropriate detail below.

As used herein, the term an "alkali-impermeable polymer" is one which is substantially impermeable to aqueous alkali during the predetermined period within which a photographic process is to be performed. Similarly, an "alkali-permeable polymer" is one which is sufficiently permeable to aqueous alkali during such a predetermined period as to permit the internal phase material to participate in the formation of an image, which image in a preferred embodiment is formed in the layer of said alkali-permeable polymer.

The alkali-impermeable matrix material may be treated to render it alkali-permeable by any suitable chemical treatment which will not adversely affect the internal phase material. Thus, by way of example, the alkali-impermeable matrix material may be an alkali-impermeable cellulose ester, such as cellulose diacetate, and said matrix material may be rendered alkali-permeable by alkaline hydrolysis. In certain instances, the alkali-impermeable matrix material may be rendered alkali-permeable by acidic hydrolysis, as in the case of a polyvinyl alcohol acetal. It will be apparent that one skilled in the art is thus provided with a great deal of flexibility and will be able to readily determine appropriate hydrolysis conditions for particular matrix and internal phase materials. It will also be apparent that the hydrolyzed matrix material may or may not be water-soluble or alkali-soluble, it being necessary only that the hydrolyzed matrix material be at least alkali-permeable so as to be processable with alkaline solutions. The selection of suitable coating solvents or hydrolyzing reagents for any specific matrix material or combination of matrix material and internal phase material is limited only by the obvious requirement that they have no adverse effects upon said materials or in the ultimate photographic application if not completely removed prior thereto. In general, it is preferred that the internal phase material be substantially insoluble in the coating solvent and hydrolyzing reagent, so that the initial fine particle size of the vacuum deposited internal phase material and its attendant advantages may be retained.

As indicated above, the processes of the present invention are specifically applicable to certain products that are particularly useful in photographic diffusion transfer processes. Such photographic processes are now quite well known and their details need not be repeated here. In a silver transfer process, for example, a photoexposed silver halide material and a silver precipitating material are subjected to an aqueous alkaline solution comprising at least a silver halide developing agent and a silver halide solvent. The developing agent reduces exposed silver halide to silver and the solvent reacts with unreduced silver halide to form a complex silver salt that migrates to the silver precipitating material where it is precipitated or reduced to form a visible silver image. It has been found that the silver precipitating material is particularly effective for this purpose when dispersed in accordance with the present invention. When, for example, the silver transfer process involves spreading a processing fluid between the superposed surfaces of a photoexposed, photosensitive silver halide stratum and another stratum, the silver precipitating material may be dispersed in either of the strata or in the fluid by vacuum depositing upon a matrix material and blending as above. If the hydrolyzed matrix material is water-insoluble, as in the case of cellulose diacetate hydrolyzed to cellulose, the resulting transfer image may be subjected to washing without danger of physical damage, the washed print exhibiting high gloss and exceptional stability characteristics. As a result of this invention, it is now possible to employ matrix materials having highly desirable physical and optical properties but which previously did not lend themselves to these photographic applications.

Specific materials of which the internal phase may be composed include heavy metals such as iron, lead, zinc, nickel, cadmium, tin, chromium, copper, cobalt, particularly noble metals such as gold, silver, platinum and palladium. Other silver precipitating agents useful as the internal phase include sulfides and selenides of heavy metals, particularly: sulfides of mercury, copper, aluminum, zinc, cadmium, cobalt, nickel, silver, lead, antimony, bismuth, cerium and magnesium; and selenides of lead, zinc, antimony and nickel. The function of such materials as silver precipitating agents in a silver transfer process is described, for example, in U.S. Pat. No. 2,774,667, issued on Dec. 18, 1956 in the names of Edwin H. Land et al. Alkali-impermeable plastic materials of which the external phase may be composed advantageously are cellulose esters, such as cellulose acetates, polyvinyl esters and acetals, such as polyvinyl acetal, etc.

One method of preparing image-receiving elements in accordance with the present invention involves vacuum depositing at least part of the material that is to constitute the internal phase, i.e., the silver precipitating agent, onto an alkali-impermeable matrix material mechanically possessing large surface area, and then blending the materials in order to disperse or to prepare to disperse the internal phase material in at least part of the material that is to constitute the external phase. The step of vacuum depositing involves either evaporating or sputtering at pressures below 100 microns of mercury and usually within the range of from 0.1 to 100 microns of mercury, these pressures being produced by continuous evacuation to ensure the rapid removal of any gases produced during the vacuum deposition process. The internal phase material is transmitted to the matrix material in submicroscopic, e.g., molecular or atomic, form. The matrix material, which may constitute at least a porportion of the external phase, initially is in powder-like or sheet-like form for the purpose of providing large surface area per mass. Where the matrix material is to constitute the external phase exclusively, the ultimate dispersion may be produced from the vacuum coated matrix material by blending, for example, by molding under heat or casting, spraying or flowing from solution. Where the matrix material is not to constitute the external phase exclusively, the matrix material, after being vacuum coated may be blended in any suitable way with the remaining materials of the external phase, for example, it may be dissolved in a solution already containing these remaining materials. The present invention thus provides a flexible technique for providing dispersions in which the internal phase, the external phase or both comprise a plurality of different materials. Thus, one or more internal phase materials may be vacuum deposited on one or more matrix materials and the resulting materials blended with one or more additional materials to provide a dispersion of desired formulation.

Methods and suitable apparatus for vacuum depositing a silver precipitant onto an alkali-permeable matrix material are described in detail in my aforementioned U.S. Pat. No. 3,295,972 and said descriptions are hereby incorporated herein by reference to said patent to avoid unnecessary repetition. The thus-described techniques and apparatus, particularly as discussed in columns 3 and 4 of said patent with respect to FIGS. 1 through 5 thereof, may be utilized to vacuum deposit a normally solid silver precipitating agent upon an alkali-impermeable matrix material in accordance with the present invention.

When the vacuum deposition is effected by evaporation, temperatures ranging from 300° to 1,500° C, in accordance with the requirements of the material being evaporated, and pressures below 0.5 microns of mercury are common. When the vacuum deposition is effected by cathode sputtering, voltages of the order of 5 to 10 kilovolts, and pressures of from 10 to 20 microns of mercury are common.

Another very useful method of preparing image-receiving elements in accordance with this invention is to form a solution of an alkali-impermeable polymer into which solution appropriate soluble reagents, e.g., silver nitrate and sodium sulfide, are added under agitation to form the desired solid silver precipitant in situ. Since the thus-formed silver precipitating agent is insoluble in the solvent in which the alkali-impermeable polymer is disolved, very fine dispersions of the silver precipitating agent may be formed. The resulting dispersions may then be coated on an appropriate support and subjected to an appropriate hydrolysis treatment.

FIG. 1 illustrates the preparation of an image-receiving element and its use in a diffusion transfer process in accordance with this invention. First, a dispersion 10 of silver precipitating nuclei is formed by one of the above-described methods, to provide a solution of an alkali-impermeable polymer having the insoluble silver precipitating nuclei dispersed therein, casting the resulting dispersion onto a support 14 to provide thereon a layer 12 of said dispersion, and subjecting the resulting dispersion layer 12 to suitable hydrolysis treatment, as by application of hydrolyzing solution 16, thereby forming an alkali-permeable silver receptive stratum 12a. A silver print is formed in said silver-receptive stratum 12a when a processing fluid 18 is applied in a uniformly thin layer between adjacent superposed surfaces of said silver-receptive stratum 12a and a photoexposed photosensitive silver halide emulsion 20 coated on a support 22. The processing fluid contains an alkaline aqueous solution of a silver halide developing agent and a silver halide solvent, and preferably is relatively viscous. The spreading, for example, may be accomplished by advancing the sheets, together with the fluid, between a pair of pressure-applying rollers. Further details of processes of this type are disclosed in U.S. Pat. No. 2,543,181, issued to Edwin H. Land on Feb. 27, 1951, and in numerous other patents and publications.

In a preferred and particularly useful embodiment of this invention, the hydrolysis treatment is so controlled as to limit the depth of hydrolysis to only a portion of the thickness of the image-receiving layer. In such an embodiment, as shown in FIG. 2, a support 14 carries a stratum 24a of a silver precipitating agent in a hydrolyzed or alkali-permeable polymer over a stratum 24b of residual unhydrolyzed or alkali-impermeable polymer also containing the silver precipitating agent. It will be noted that these strata are not mutually exclusive or separate layers, but represent the depthwise partial conversion of a single, continuous layer. This relationship will be true even though the silver-receptive layer is applied in a series of coatings to obtain the desired final thickness, since the use of a common coating solvent and matrix material will effectively avoid the formation of an interface between the successive coatings.

In an alternative embodiment, the finely dispersed silver precipitating agent, in proximity with which the transfer image forms, is distributed in the processing fluid rather than in a precoated silver precipitating stratum. Such a processing fluid is formed by vacuum depositing a silver precipitating agent on a suitable matrix, subjecting the matrix material to hydrolysis, and dispersing the product in an aqueous alkaline solution of a silver halide developing agent and a silver halide solvent. The processing fluid then is spread between a support or spreading sheet and a photoexposed photosensitive silver halide stratum. Here, while the transfer print is being formed in the layer of processing fluid, the processing fluid hardens into a continuous film which may be stripped with the spreading sheet from the photosensitive stratum after it has received a silver print by transfer. Further details of processes of this type are disclosed in U.S. Pat. No. 2,662,822, issued in the name of Edwin H. Land on Dec. 15, 1953.

The photosensitive stratum may contain one or more of the silver halides, of which silver chloride, silver bromide and silver iodide are examples, dispersed in a suitable protective colloid material, for example, gelatin, agar, albumen, casein, collodion, a cellulosic such as carboxymethyl cellulose, a vinyl polymer such as polyvinyl alcohol or a linear polyamide such as polyhexamethylene adipamide. Examples of specific formulations of conventional emulsions suitable for such use are described in T. T. Baker, *Photographic Emulsion Technique*, American Photographic Publishing Company, Boston, 1948, Chapter IV.

Suitable silver halide developing agents include: benzene derivatives having at least two hydroxyl and/or amino groups substituted in ortho or para position on the benzene nucleus, such as hydroquinone, amidol, metol, glycin, p-aminophenol and pyrogallol; and hydroxylamines, in particular, primary and secondary aliphatic and aromatic N-substituted or $\beta$-hydroxylamines which are soluble in aqueous alkali, including hydroxylamine, N-methyl hydroxylamine, N-ethyl hydroxylamine, and others described in U.S. Pat. No. 2,857,276, issued Oct. 21, 1958 to Edwin H. Land et al and N-alkoxyalkyl-substituted hydroxylamines as described in U.S. Pat. No. 3,293,034 issued Dec. 20, 1966 to Milton Green et al. Suitable silver halide solvents include conventional fixing agents such as sodium thiosulfate, sodium thiocyanate, ammonium thiosulfate and others described in the aforementioned U.S. Pat. No. 2,543,181; and associations of cyclic imides and nitrogenous bases such as associations of barbiturates or uracils, and ammonia or amines, and other associations described in U.S. Pat. No. 2,857,274, issued Oct. 21, 1958 to Edwin H. Land et al.

The following examples are intended to be illustrative of this invention and are not intended to be limiting.

EXAMPLE I

An image-receiving element was prepared as follows: gold wire was evaporated in a rotating bell jar chamber, under vacuum (approximately $10^{-4}$ mm Hg), onto 50 g. of cellulose triacetate flakes; chemical analysis showed that the product contained 2.6% gold by weight. A coating solution was prepared by dissolving 11 g. of this mixture in 109 cc. of ethyl acetate, 36 cc. of methanol and 3 cc. of water. This coating solution was applied to baryta paper to provide a layer approximately 0.00035 inch thick. The thus formed cellulose acetate layer was treated with a hydrolyzing solution in accordance with the procedure described in Ostberg, U.S. Pat. No. 3,078,178 issued July 27, 1962, the hydrolyzing solution being applied to the surface of the cellulose acetate layer and being effective to hydrolyze the cellulose acetate to cellulose to a depth approximately half the thickness of said cellulose acetate layer.

EXAMPLE II

A silver halide emulsion of the type employed in Type 47 Polaroid Land Film was exposed. A layer 0.0026 inch thick of a processing fluid of the type used in said Type 47 film was spread between the exposed negative and an image-receiving element prepared as described in Example I. After an imbibition period of 1 minute, the image-receiving element was separated from the negative and washed under running water. A positive silver transfer image was present in the cellulose layer, the surface of which was glossy and highly scratch-resistant. This transfer image exhibited excellent resistance to attack by sulfur on accelerated aging tests.

EXAMPLE III

The procedure described in Example I was repeated except that the coating solution was applied to a transparent cellulose acetate film base. The resulting image-receiving element is particularly useful in forming transfer images to be viewed by transmitted light or to be projected, i.e., transparencies.

EXAMPLE IV

The procedure described in Example I was repeated except that the coating solution was applied to a transparent support carrying a translucent layer provided by a dispersion of titanium dioxide. The translucent layer of titanium dioxide permits the resulting transfer image to be viewed by reflected or transmitted light.

Image-receiving elements prepared in accordance with this invention may be employed in diffusion transfer processes wherein a negative silver transfer image is formed by preferential solubilization and transfer of silver halide from exposed areas as a function of development of exposed silver halide; such processes are the subject matter of U.S. Pat. No. 3,563,143 issued Oct. 26, 1971 to Edwin H. Land, Meroe M. Morse, and Leonard C. Farney. This use is illustrated by the following example:

EXAMPLE V

A sheet of high speed panchromatic negative was exposed at an exposure equivalent to 1/100 at f/45. The exposed negative then was processed by spreading a layer of processing fluid, approximately 0.0018 inch thick, between the exposed negative and an image-receiving element prepared as described in Example I. The processing fluid comprised:

| | |
|---|---|
| Sodium carboxymethyl cellulose (medium viscosity) | 13.9 g. |
| Sodium carboxymethyl cellulose (high viscosity) | 25 g. |
| Sodium sulfite | 33 g. |
| Potassium thiosulfate | 48 g. |
| Potassium hydroxide | 10 g. |
| Hydroquinone | 10 g. |
| Metol | 30 g. |
| Diethylamine | 50 cc. |
| Sodium hydroxide | 25.8 g. |
| 1-phenyl-5-mercaptotetrazole | 3 g. |
| Water to make 1 liter | |

After an imbibition period of 3 ½ minutes, the image-receiving element was separated from the exposed negative and rinsed under running water. The image-receiving layer contained a negative silver transfer image, having transmission densities of $D_{max}$. 2.55 and $D_{min}$. 0.58. Plotting the characteristic curve of the negative transfer image gave an Equivalent A.S.A. Exposure Index of 30,000.

EXAMPLE VI

Cellulose diacetate was dissolved in a 1:3 mixture by weight of methanol and ethyl acetate containing a small amount of water. Cadmium acetate, lead acetate and sodium sulfide were added with agitation to this solution to form a colloidal dispersion of cadmium and lead sulfides in the cellulose diacetate solution. This dispersion was then coated on baryta paper, and the dried cellulose diacetate layer subjected to hydrolysis with a methanol-water solution of sodium hydroxide to hydrolyze a depthwise portion of the cellulose diacetate layer to cellulose. The thus-hydrolyzed sheet was washed to remove absorbed sodium hydroxide and dried. Examination of a cross-section of this sheet showed that the total thickness of the combined cellulose-cellulose diacetate coating was 0.00030 inch, of which 0.00008 inch was cellulose. The thus-prepared image-receiving sheet was processed by spreading a layer approximately 0.0030 inch thick of a processing composition comprising:

| | |
|---|---|
| Potassium hydroxide | 156.5 g. |
| Uracil | 80 g. |
| Natrosol 250 (trade name of Hercules Corp. for hydroxyethyl cellulose, high viscosity) | 50 g. |
| Zinc acetate | 15 g. |
| N,N-di-methoxyethyl-hydroxyamine | 50 cc. |
| Water | 1000 cc. | between the image-receiving element and an exposed photo-sensitive silver halide emulsion. After an imbibition period of 30 seconds, the image-receiving element contained a silver transfer image of good density and contrast. The image tone was rendered more neutral by incorporating a small quantity of a toning agent in the processing composition, e.g., 0.01 g. of thiazolidine thione per liter. Alternatively, or in addition, incorporation in the receiving layer of a small quantity of the same or a different toning agent has also been found to be helpful in obtaining silver transfer images having neutral tone. Application of a thin strip coat, e.g., of dimethyl hydantoin formaldehyde or gum arabic, to the surface of the hydrolyzed image-receiving layer has been found to be helpful in preventing or minimizing adhesion of the solidified layer of processing composition to the image-receiving element upon separation of the superposed elements.

EXAMPLE VII

The procedure described in Example VI was repeated using nickel acetate and sodium sulfide to form a colloidal dispersion of nickel sulfide in cellulose diacetate.

EXAMPLE VIII

The procedure described in Example VI was repeated using silver nitrate and sodium sulfide to form a colloidal dispersion of silver sulfide in cellulose diacetate.

EXAMPLE IX

Baryta paper was coated with a layer 0.4 mil thick of a 3:1 mixture by weight of cellulose acetate and methyl vinyl ether/maleic anhydride copolymer. A layer of cellulose diacetate containing a mixture of lead and cadmium sulfides was then applied and this layer subjected to alkaline hydrolysis as in the prior examples to leave a stratum of unhydrolyzed cellulose diacetate approximately 0.02 to 0.05 mil thick. Diffusion transfer processing as in Example VI resulted in the processing composition penetrating through the thin residual unhydrolyzed cellulose diacetate stratum to the layer containing the methyl vinyl ether/maleic anhydride copolymer, thereby effecting a reduction in the pH of the image layer. The resulting silver transfer image exhibited higher gloss and greater stability to sulfur and sulfide attack in accelerated aging tests.

EXAMPLE X

The procedure described in Example IX was repeated using a layer of 0.4 mil thick comprising the butyl half ester of ethylene/maleic anhydride copolymer.

EXAMPLE XI

An image-receiving element was prepared as follows: a coating solution of ethyl acetate, methanol and cellulose diacetate flake (onto which gold had been evaporated to a concentration of approximately 1% by weight) was coated onto baryta paper to provide a layer of cellulose diacetate approximately 0.3 mil thick. This layer was then hydrolyzed to cellulose to a depth of approximately 0.15 mil. A medium speed silver halide emulsion was exposed and processed by spreading a layer approximately 0.0033 inch thick of a processing composition comprising:

| | |
|---|---|
| Water | 168.0 cc. |
| Sodium carboxymethyl cellulose (medium viscosity) | 12.0 g. |
| Sodium hydroxide | 3.6 g. |
| Sodium thiosulfate pentahydrate ($Na_2S_2O_3 \cdot 5\ H_2O$) | 13.5 g. |
| Potassium thiosulfate ($3\ K_2S_2O_3 \cdot H_2O$) | 4.1 g. |
| Glycerin | 27.0 cc. |
| 2,6-dimethyl-4-aminophenol hydrochloride | 3.6 g. | between said exposed emulsion and said image-receiving element. After an imbibition period of 45 seconds, the image-receiving element was separated and contained a grey positive image.

EXAMPLE XII

The procedure described in Example XI was repeated using a processing composition comprising:

| | |
|---|---|
| Water | 154.0 cc. |
| Sodium carboxymethyl cellulose (medium viscosity) | 6.0 g. |
| Sodium carboxymethyl cellulose (high viscosity) | 2.0 g. |
| Sodium sulfite | 8.0 g. |
| Sodium thiosulfate pentahydrate | 4.3 g. |
| Potassium bromide | 0.5 g. |
| Phenidone | 0.2 g. |
| Sodium hydroxide | 2.0 g. |
| Hydroquinone | 2.6 g. |

After a 45 second imbibition period, the image-receiving element was separated and contained a brown-black image denser than obtained in Example XI but of lower film speed.

Images obtained in regenerated cellulose in accordance with this invention exhibit very good stability if washed with water. It has been found that the images prepared using a cyclic imide silver solvent, e.g., uracil, urazole, 5-methyl uracil, etc., and a hydroxylamine developing agent exhibit greater stability if not washed than do similar images prepared using thiosulfate silver solvents and benzenoid silver halide developing agents. One accelerated aging test used to evaluate images obtained in accordance with this invention is to suspend the image over saturated sodium chloride solution for 1 hour at 85° C in a closed vessel. It has been found, as disclosed and claimed in U.S. Pat. No. 3,607,269 issued Sept. 21, 1971 to Richard W. Young, that the tendency of images to brown in this accelerated test may be minimized or avoided by incorporating a mercapto compound in the image receiving element in such a location that it is released, after a delay, by the processing composition. A particularly useful technique to accomplish this is to incorporate the mercapto compound in the residual unhydrolyzed cellulose acetate stratum or in an undercoat of cellulose acetate free of silver precipitating nuclei. Useful mercapto compounds for this purpose include 1-phenyl-5-mercaptotetrazole, imidazolidine thione, 3-acetylamino-5-mercapto-2-thiadiazole, etc.

As previously noted, in a particular useful embodiment of this invention the coated alkali-impermeable polymeric layer is hydrolyzed to a depth less than its total thickness, i.e., there is a residual, unhydrolyzed stratum after the hydrolysis treatment. This residual unhydrolyzed stratum may be put to advantageous use as a moisture proofing "subcoat", particularly where the support is a moisture permeable material such as baryta paper. This residual unhydrolyzed stratum may also be utilized to "exhaust" certain of the processing reagents, e.g., sodium or potassium hydroxide, as a result of further or "secondary" hydrolysis during the imbibition period of the diffusion transfer process. Thus, secondary hydrolysis during imbibition of residual unhydrolyzed cellulose acetate will consume alkali by release of acetic acid and formation of the corresponding alkali salt. This in-situ secondary hydrolysis is promoted by elevated temperature. Furthermore, hydrolysis during imbibition of residual unhydrolyzed polymer may be utilized as a mechanism by which reagent, e.g., a polymeric acid as in Examples IX and X above, is released or otherwise made available in the later stages of the imbibition period to complete or enhance image formation.

It will be noted that where the pre-imbibition hydrolysis is of only a portion of the image-receiving layer, the silver precipitating nuclei are present in both the hydrolyzed and unhydrolyzed portions of this layer. Examination of photomicrographs of cross-sections of such partially hydrolyzed cellulose acetate receiving layers has unexpectedly shown that the transfer image silver is deposited only in the pre-imbibition hydrolyzed portion, even though a substantial portion of the originally unhydrolyzed cellulose acetate has been hydrolyzed by the secondary hydrolysis during imbibition and silver precipitating nuclei were thus made available deeper in the image-receiving layer.

Where the alkali-impermeable polymer is cellulose acetate, as in the preferred embodiments of this invention, it has been found that good results can be obtained where the cellulose acetate has been hydrolyzed to a depth of about 0.00002 to 0.00015 inches, the total thickness of the hydrolyzed and unhydrolyzed portions being about 0.00010 to 0.00050 inches, these thicknesses being measured after hydrolysis (and prior to diffusion transfer processing) since some shrinking of the original coated thickness will occur as a result of the hydrolysis and subsequent heat drying. In the most useful embodiments, the hydrolyzed portion is about 0.00005 to 0.00010 inches and the total thickness of the hydrolyzed and unhydrolyzed portions is about 0.00025 to 0.00030 inches. The total thickness prior to hydrolysis may be about 0.00015 to 0.00060 inches, and preferably about 0.00030 to 0.00035 inches.

It has previously been proposed to form silver transfer images in regenerated cellulose. Such prior proposals have involved imbibing appropriate soluble silver precipitant precursors, e.g., gold chloride or lead acetate, and chemically treating the precursor to form the desired insoluble silver precipitant in situ, e.g., by chemically reducing the gold chloride to colloidal gold or reacting the lead acetate with sodium sulfide to form lead sulfide. In such instances, the silver precipitants are probably not uniformly distributed but are more likely to be formed near the surface of the regenerated cellulose stratum and obviously will not be formed in the underlying unhydrolyzed, i.e., cellulose acetate, stratum. It is extremely difficult to control the particle size and activity of silver precipitants thus formed, whereas these characteristics can be readily and reproducibly controlled by the processes of the present invention. It will further be noted that in such prior uses of regenerated cellulose as silver receptive layers, the silver precipitating nuclei were not present during the hydrolysis treatment. Although it has not been possible to characterize with certainty the nature of the effect of the alkaline hydrolysis treatment upon the silver precipitating nuclei, it has been found that there is a beneficial effect. Thus, while precipitants such as nickel sulfide are generally considered to be substantially insoluble, it has been found that the alkali metal hydroxide hydrolysis bath may dissolve out a measurable portion of the dispersed nickel sulfide, presumably the smallest particles of the nickel sulfide nuclei, and will dissolve out at least a portion of the excess soluble free metal ions usually present when metal sulfide precipitants are used.

As is well known in the art, silver precipitants are present in very low quantities, e.g., about 1 to $25 \times 10^{-6}$ moles per square foot. Higher levels are usually less desirable as they may cause excessive silver deposition or undesirable background density in the highlight areas. Mixtures of silver precipitants may be used. In general, the reflection density to white light of the unprocessed but hydrolyzed image-receiving layer coated on baryta should be less than 0.05 as compared with the uncoated baryta paper. The image-receiving layer thus may be described as substantially colorless and substantially transparent insofar as the presence of the nuclei is concerned. In certain instances it may be desirable to incorporate very small quantities of a blue or purple dye into the cellulose acetate coating solution, e.g., 0.5 to 5 cc. of a 1% solution of the dye per liter of coating solution, to act as a yellow filter to neutralize any background color imparted by diffusion transfer processing. Examples of dyes which may be used for this purpose include methylene blue, Direct Blue 70, methyl violet, Benzoform Brilliant Blue, etc.

It is within the scope of this invention to incorporate other reagents, e.g., toning agents or additional silver precipitating agents, in the coating solution prior to forming the image-receiving layer, such reagents being soluble in the organic solvent or in any water which is present.

Where the external matrix material is hydrolyzed to a form which exhibits an adhesive tendency towards the solidified layer of processing fluid, e.g., as may occur where the surface of the image-receiving element is converted to cellulose and the processing fluid contains a film-forming polymer such as sodium carboxymethyl cellulose or hydroxyethyl cellulose, it may be desirable to coat the hydrolyzed surface with a suitable stripping layer to facilitate separation of the image-receiving element from the layer of processing fluid. Materials suitable for providing a stripping layer are well known in the art, and are exemplified by materials such as cellulose acetate hydrogen phthalate. It will be appreciated, however, that in some instances it may be desirable to have the solidified layer of processing fluid preferentially adhere to the surface of such an image-receiving layer, in which event such a stripping layer should be omitted.

Additive color images may be formed by forming the silver transfer image in a silver-receptive stratum formed in accordance with this invention, said image being in registered relationship with an additive color screen. In such embodiments, the additive color screen is preferably positioned between a transparent support and said silver-receptive stratum, exposure of the silver halide emulsion being effected through said screen.

It is also contemplated to utilize the techniques of this invention in high covering power transfer processes of the type disclosed in U.S. Pat. No. 2,861,885 issued Nov. 25, 1958 to Edwin H. Land, wherein the positive transfer image may be maintained in superposed relationship with the developed silver halide layer and viewed as a positive image.

It is also contemplated that the silver halide emulsion may be coated over the image-receptive stratum, the silver halide emulsion being removable after processing, as by provision of a suitable stripping layer or by employment of a silver halide emulsion which may be readily washed off after processing, e.g., a silver halide emulsion wherein the binder is cellulose acetate hydrogen phthalate. Alternatively, a pigmented layer, e.g., titanium dioxide in gelatin or a suitable plastic, may be positioned between the silver halide emulsion and the silver-receptive stratum coated on a transparent base, and the silver transfer image viewed through the transparent base against the pigmented layer, the pigmented layer masking out the image in the developed silver halide emulsion layer.

It will be understood that it is within the scope of this invention to cast or extrude the dispersion of silver precipitating agent in the alkali-impermeable polymer to form a self-supporting element, and thereafter hydrolyze only a portion of said element so that the image-receiving stratum is essentially integral with its support.

The herein disclosed embodiments of the present invention thus provide a variety of techniques for controlling the dispersion of print-forming materials in a wide variety of diffusion transfer processes.

As noted above, colloidal dispersions of silver precipitating agents, e.g., silver or gold, previously have been proposed for use in diffusion transfer processes. Such colloidal dispersions usually are formed by chemical reduction of suitable soluble salts of the metal. While such colloidal dispersions are useful in silver transfer processes, it is extremely difficult to accurately and reproducibly control the size distribution of the dispersion particles. In addition, the method of preparation inherently presents problems of removing the anions of the metallic salt and other by-products which may be undesirable or detrimental in the ultimate photographic utilization. The procedures disclosed herein for preparing dispersions permit more accurate control of particle size and avoid the introduction of possible contaminants. In addition, it has been found that use of the herein disclosed dispersions in silver transfer processes unexpectedly provides silver transfer images having more neutral and more even tones than are obtained by use of previously proposed silver precipitating agents in the absence of special toning agents. Thus, use of the dispersion of gold as in Example II gives silver transfer images of unusually neutral tones, and the tone varies very little with variations in density, i.e., the various steps in a step tablet transfer image exhibited substantially even neutral tones, notwithstanding differences in density.

It is also recognized that is has been proposed, as in U.S. Pat. No. 2,947,646, issued to Devaney et al on Aug. 2, 1960 to form colloidal dispersions of metals in plastics, but such proposals have not contemplated the formation of photographically useful dispersions of the type or in the manner herein described.

Since certain changes may be made in the above products and processes without departing from the scope of the invention herein involved, it is intended that all matter contained in the above description or shown in the accompanying drawings shall be interpreted as illustrative and not in a limiting sense.

What is claimed is:

1. An image-receiving element for use in a silver transfer process, said element comprising a support carrying a stratum of regenerated cellulose containing a silver precipitating agent, a stratum of an alkali-hydrolyzable cellulose ester immediately contiguous the inner surface of said regenerated cellulose, said stratum of cellulose ester also containing a silver precipitating agent.

2. An image-receiving element as defined in claim 1, wherein said support is baryta paper, and said stratum of cellulose ester is coated directly upon said baryta paper.

3. An image-receiving element as defined in claim 1, wherein said cellulose ester is cellulose diacetate.

4. An image-receiving element as defined in claim 3, including a stratum of vinyl ether/maleic anhydride copolymer between said support and said stratum of cellulose diacetate.

5. An image-receiving element comprising a support carrying a silver-receptive stratum of regenerated cellulose containing a silver precipitating agent, a stratum of an alkali-hydrolyzable cellulose ester immediately contiguous the inner surface of said regenerated cellulose, said stratum of cellulose ester also containing a silver precipitating agent, and a layer of a silver halide emulsion carried by said silver-receptive stratum.

6. An image-receiving element as defined in claim 1, wherein said silver precipitating agent is nickel sulfide.

7. A product as defined in claim 1, including a layer of a polymeric acid positioned between said support said layer of cellulose acetate.

8. A product as defined in claim 1, wherein said stratum of regenerated cellulose includes a toning agent for silver transfer images.

9. A product useful in forming image receiving layers for use in silver diffusion transfer photographic processes, said product comprising a support carrying a layer of cellulose acetate containing a silver precipitating agent distributed therein in a quantity of about 1 to $25 \times 10^{-6}$ moles per square foot, said cellulose acetate layer being substantially colorless and transparent and having a thickness of less than about 0.00060 inches.

10. A product as defined in claim 9, wherein said support is transparent.

11. A product as defined in claim 9, including a layer of a polymeric acid positioned between said support and said layer of cellulose acetate.

12. A product as defined in claim 9 wherein said layer of cellulose acetate includes a toning agent for silver tranfer images.

13. A product as defined in claim 9, wherein said support is baryta paper.

14. An image-receiving element for use in silver diffusion transfer processes, said image-receiving element comprising a support and a thin substantially transparent silver-receptive stratum carried by said support, said silver-receptive stratum comprising an alkali-permeable organic polymer and a silver precipitating agent, said silver receptive stratum having been formed by vacuum depositing a normally solid silver precipitating agent upon an alkali-impermeable organic polymer in a form presenting a large surface area, mixing the resultant product with a liquid which is a solvent for said organic polymer and a nonsolvent for said vacuum deposited silver precipitating agent, thereafter dissolving said organic polymer and forming a fine dispersion comprising said vacuum deposited silver precipitating agent as the discontinuous phase and said organic polymer as at least part of the continuous phase of said dispersion, coating said dispersion in a thin stratum on said support, and hydrolyzing at least a depthwise portion of said alkali-impermeable organic polymer to said alkali-permeable organic polmer 15. An image-receiving element as defined in claim 14, wherein said alkali-permeable organic polymer is cellulose and said alkali-impermeable polymer is a cellulose ester.

16. An image-receiving element as defined in claim 14, wherein a layer of a silver halide emulsion is carried by said silver receptive stratum.

17. An image-receiving element as defined in claim 3, including a stratum of a butyl half-ester of ethylene/maleic anhydride copolymer.

18. A product as defined in claim 11, wherein said polymeric acid is a vinyl ester/maleic anhydride copolymer.

19. A product as defined in claim 11, wherein said polymeric acid is a butyl half-ester of ethylene/maleic anhydride copolymer.

* * * * *